(12) United States Patent
Terazawa

(10) Patent No.: US 8,466,730 B2
(45) Date of Patent: Jun. 18, 2013

(54) PULSE GENERATOR AND METHOD OF DISPOSING PULSE GENERATOR

(75) Inventor: Tatsuya Terazawa, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/561,273

(22) Filed: Jul. 30, 2012

(65) Prior Publication Data

US 2012/0286842 A1 Nov. 15, 2012

Related U.S. Application Data

(63) Continuation of application No. PCT/JP2012/051240, filed on Jan. 20, 2012.

(30) Foreign Application Priority Data

Mar. 22, 2011 (JP) ................................. 2011-062588

(51) Int. Cl.
*H03K 3/00* (2006.01)
(52) U.S. Cl.
USPC ................................ 327/304; 307/98; 307/99
(58) Field of Classification Search
USPC ....................................... 327/304; 307/98, 99
See application file for complete search history.

(56) References Cited

U.S. PATENT DOCUMENTS

| | | | |
|---|---|---|---|
| 5,023,473 A * | 6/1991 | Toyooka et al. | 327/110 |
| 5,695,619 A | 12/1997 | Williamson et al. | |
| 5,843,383 A | 12/1998 | Williamson et al. | |
| 5,855,855 A | 1/1999 | Williamson et al. | |
| 5,977,716 A | 11/1999 | Motouchi | |
| 2007/0103951 A1 | 5/2007 | Ishikawa et al. | |
| 2010/0329940 A1 | 12/2010 | Takahashi et al. | |

FOREIGN PATENT DOCUMENTS

| | | |
|---|---|---|
| JP | 07-119565 A1 | 5/1995 |
| JP | 09-099211 A1 | 4/1997 |
| JP | 09-184455 A1 | 7/1997 |
| JP | 09-298454 A1 | 11/1997 |
| JP | 2000-018107 A1 | 1/2000 |
| JP | 2002-231536 A1 | 8/2002 |
| JP | 2004-350360 A1 | 12/2004 |
| JP | 2007-107491 A1 | 4/2007 |
| JP | 2007-135252 A1 | 5/2007 |
| JP | 2007-181375 A1 | 7/2007 |
| JP | 2007-209155 A1 | 8/2007 |
| JP | 2011-005418 A1 | 1/2011 |

OTHER PUBLICATIONS

International Search Report dated Apr. 10, 2012.

* cited by examiner

*Primary Examiner* — John Poos
(74) *Attorney, Agent, or Firm* — Burr & Brown

(57) ABSTRACT

A semiconductor switching device having a switch circuit is disposed in an environment having a relatively low temperature, with a transformer disposed in an environment having a relatively high temperature. A conduction path extends from a first DC input terminal to a second DC input terminal. An inductor is inserted in a section from a first branch to a second branch in the conduction path, and the switch circuit is inserted in a portion other than the section of the conduction path. A first transmission wire of a transmission line electrically connects the first branch and a first input terminal of a primary winding to each other. A second transmission wire of the transmission line electrically connects the second branch and a second input terminal of the primary winding to each other, and where the excitation inductance of the primary winding is higher than the excitation inductance of the inductor.

3 Claims, 6 Drawing Sheets

F I G . 1
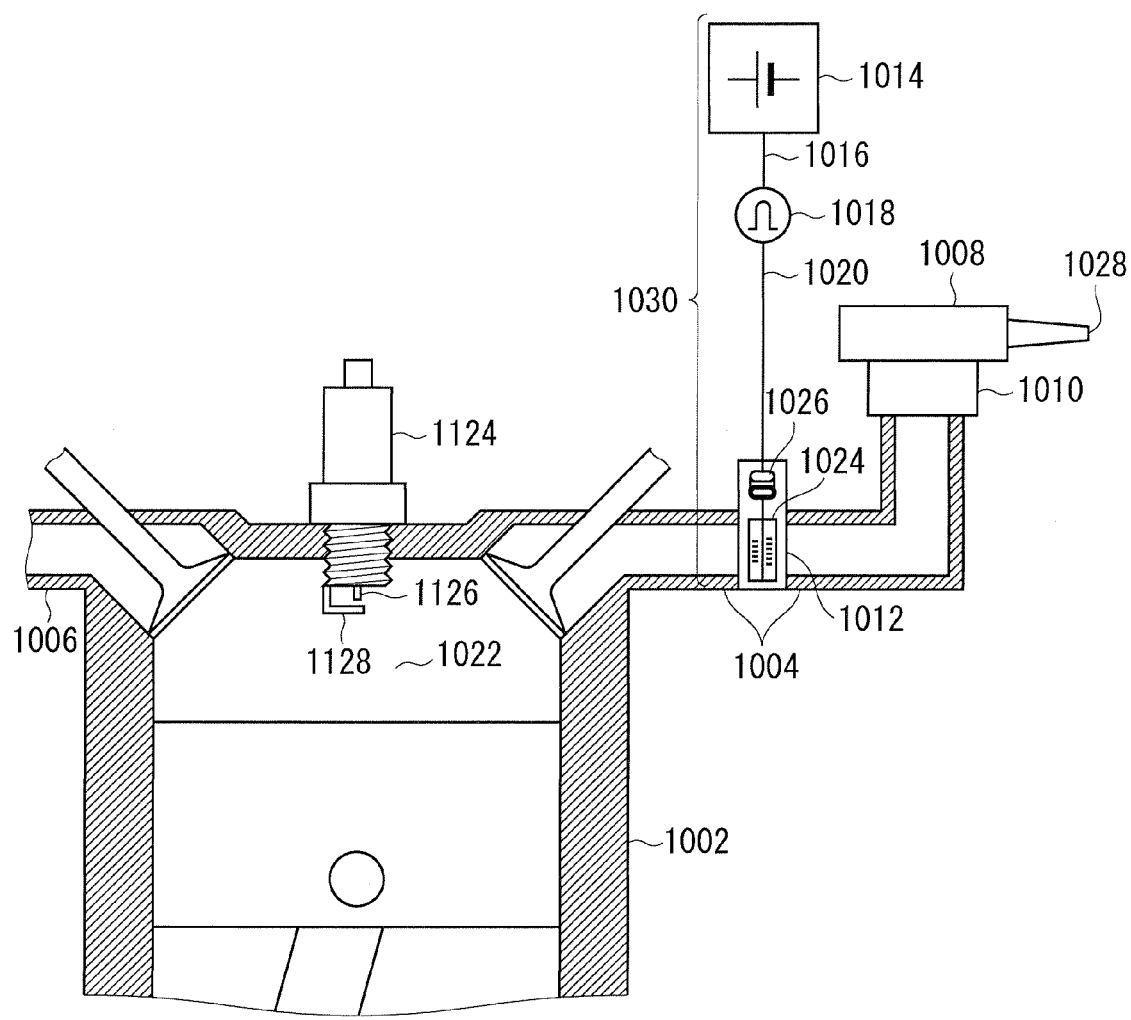

F I G. 4
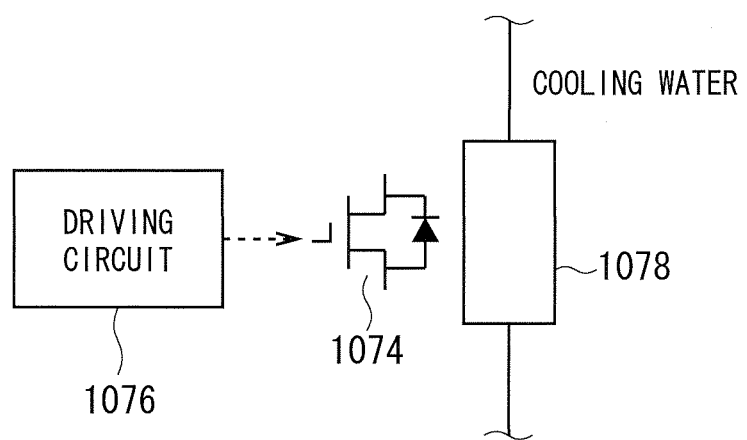

PULSE GENERATOR AND METHOD OF DISPOSING PULSE GENERATOR

TECHNICAL FIELD OF THE INVENTION

The present invention relates to a pulse generator and a method of disposing the pulse generator.

BACKGROUND OF THE INVENTION

When an engine generates a power, intake air is guided to a combustion chamber and a combustible substance is burned in the combustion chamber. A thermal energy generated by the burning of the combustible substance is converted into a mechanical energy. By the burning of the combustible substance, the temperature in the vicinity of the combustion chamber is raised greatly.

On the other hand, it is proposed to activate the intake air through a discharge in order to carry out promotion of the burning of the combustible substance or the like. Patent Document 1 is taken as an example. In Patent Document 1, an electrode is provided close to an inlet of an intake manifold and a pulse voltage is applied to the electrode.

When the electrode is moved away from the combustion chamber, the activated intake air tends to be deactivated. For this reason, the electrode is desirably caused to approach the combustion engine. When the electrode is caused to approach the combustion chamber, the electrode is disposed at a high temperature.

Although Patent Documents 2 and 3 are not intended for the solution of problems to be solved by the present invention, they disclose matters related to the present invention.

Patent Document 2 describes a pulse generating circuit of an induction energy storage type in which an inductor and a primary winding of a transformer are connected in parallel. Patent Document 2 describes that the excitation inductance of a primary winding of a transformer is higher than the excitation inductance of an inductor.

Patent Document 3 describes the necessity of heat radiation of a semiconductor switching device.

PRIOR ART DOCUMENT

Patent Document

Patent Document 1: Japanese Patent Application Laid-Open No. 7-119565 (1995)
Patent Document 2: Japanese Patent Application Laid-Open No. 2007-181375
Patent Document 3: Japanese Patent Application Laid-Open No. 9-298454 (1997)

SUMMARY OF INVENTION

Problems to be Solved by the Invention

When a pulse generating circuit is caused to approach an electrode in a state in which the electrode is close to a combustion chamber, the pulse generating circuit approaches the combustion chamber so that a semiconductor switching device is disposed at a high temperature and the heat radiation of the semiconductor switching device is hard to perform.

To the contrary, when the pulse generating circuit is moved away from the electrode, a wiring is lengthened and a floating capacitance is increased so that it is hard to apply a pulse voltage having a high peak voltage and a small pulse width to the electrode and a pulse voltage cannot be transmitted efficiently to a load.

The present invention has been made to solve these problems. It is an object of the present invention to provide a pulse generator in which a pulse voltage can efficiently be transmitted to a load and heat radiation of a semiconductor switching device can easily be carried out, and a method of disposing the same.

First to third aspects of the present invention are directed to a pulse generator.

According to the first aspect of the present invention, a conduction path, an inductor, a switch circuit, a transformer, and a transmission line are provided.

The conduction path extends from a first DC input terminal to a second DC input terminal via a first branch and a second branch in sequence.

The inductor is inserted in a section from the first branch to the second branch in the conduction path and the switch circuit is inserted in a portion other than the section of the conduction path. The switch circuit includes a semiconductor switching device and electrically opens/closes the conduction path.

The transformer includes a primary winding and a secondary winding. The primary winding has a first input terminal and a second input terminal. The secondary winding has a first output terminal and a second output terminal. The transformer is magnetically independent from the inductor.

The transmission line includes a first transmission wire and a second transmission wire. The first transmission wire electrically connects the first branch and the first input terminal to each other. The second transmission wire electrically connects the second branch and the second input terminal to each other.

The excitation inductance of the primary winding is higher than the excitation inductance of the inductor. The semiconductor switching device is disposed in an environment having a relatively low temperature and the transformer is disposed in an environment having a relatively high temperature.

According to the second aspect of the present invention, a further matter is added to the first aspect of the present invention. In the second aspect of the present invention, there is provided a cooling mechanism for cooling the semiconductor switching device.

According to the third aspect of the present invention, a further matter is added to the first or second aspect of the present invention. In the third aspect of the present invention, the transformer is provided with a magnetic core. The magnetic core includes an incomplete ring member and a gap filling member. The primary winding and the secondary winding are wound around the incomplete ring member. The incomplete ring member is formed by a ferromagnetic material and the gap filling member is formed by a paramagnetic material. The incomplete ring member has a gap and the gap filling member fills in the gap.

A fourth aspect of the present invention is directed to the method of disposing a pulse generator.

According to the fourth aspect of the present invention, the pulse generator is prepared and disposed.

The pulse generator includes a conduction path, an inductor, a switch circuit, a transformer, and a transmission line.

The conduction path extends from a first DC input terminal to a second DC input terminal via a first branch and a second branch in sequence.

The inductor is inserted in a section from the first branch to the second branch in the conduction path and the switch circuit is inserted in a portion other than the section of the conduction path. The switch circuit includes a semiconductor switching device and electrically opens/closes the conduction path.

The transformer includes a primary winding and a secondary winding. The primary winding has a first input terminal and a second input terminal. The secondary winding has a first output terminal and a second output terminal. The transformer is magnetically independent from the inductor.

The transmission line includes a first transmission wire and a second transmission wire. The first transmission wire electrically connects the first branch and the first input terminal to each other. The second transmission wire electrically connects the second branch and the second input terminal to each other.

The excitation inductance of the primary winding is higher than the excitation inductance of the inductor.

In the case in which the pulse generator is disposed, the semiconductor switching device is disposed in an environment having a relatively low temperature and the transformer is disposed in an environment having a relatively high temperature.

According to the first and fourth aspects of the present invention, a large current does not flow to the transmission line when an induction energy is stored in the inductor, and the storage of the induction energy in the inductor is not disturbed and a pulse voltage having a high peak voltage is thus generated even if the length of the transmission line is increased. Even if the length of the transmission line is increased, moreover, the influence of a parasitic capacitance is small so that a pulse voltage having a small pulse width is generated. Consequently, the pulse voltage can efficiently be transmitted to a load.

Moreover, the semiconductor switching device is disposed in an environment having a lower temperature than the transformer so that the heat radiation of the semiconductor switching device can easily be carried out.

According to the second aspect of the present invention, the temperature of the semiconductor switching device is lowered so that the pulse voltage is generated stably.

According to the third aspect of the present invention, the hysteresis of magnetization of the magnetic core is decreased and the state of magnetization of the magnetic core is returned into a certain state after a pulse is generated. Consequently, a uniform pulse is generated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram showing an engine and accessories thereof.

FIG. 4 is a schematic diagram showing a desirable cooling configuration for a semiconductor switching device.

Figure 2:
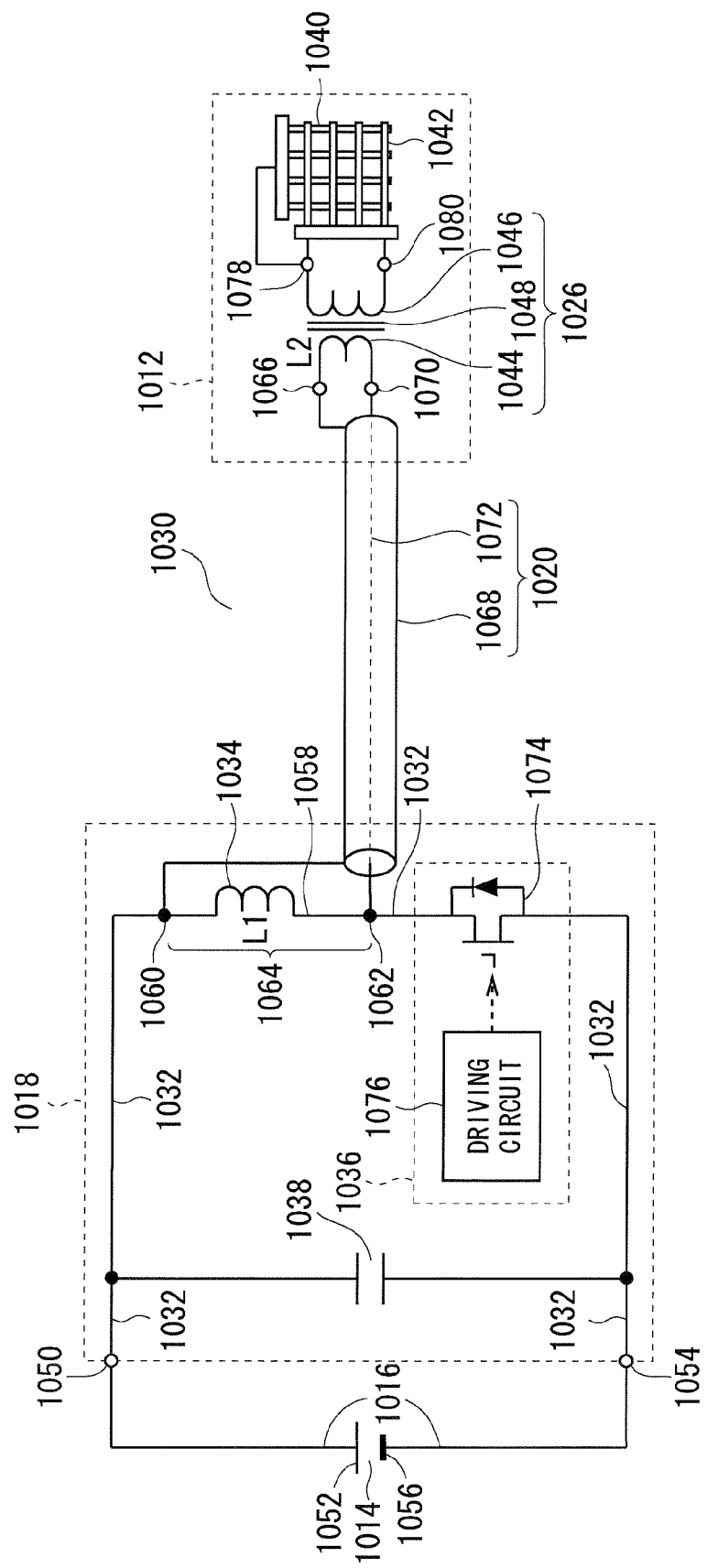
FIG. 2 is a circuit diagram showing an electrical system.

DETAILED DESCRIPTION OF THE INVENTION (Summary of Engine and Accessory Thereof)

The schematic diagram of FIG. 1 shows an engine and accessories thereof.

As shown in FIG. 1 an intake pipe 1004, an exhaust pipe 1006, an air cleaner 1008, a carburetor 1010, a reformer body 1012, a battery 1014, a power wiring 1016, a pulse generator body 1018 and a coaxial cable 1020 are attached to an engine 1002. A combustion chamber 1022 is formed in the engine 1002. The engine 1002 includes an ignition plug 1124. The reformer body 1012 includes a reactor 1024 and a transformer 1026.

(Type of Engine)

The engine 1002 is a heat engine for converting, into a mechanical energy, a thermal energy generated by burning a combustible substance in the combustion chamber 1022. The temperature is gradually raised toward the combustion chamber 1022 around the engine 1002.

The engine 1002 is desirably an internal combustion engine and is more desirably a reciprocating engine. The reciprocating engine may be a 4-cycle engine or a 2-cycle engine. The engine may be an external combustion engine. Moreover, the engine is an internal combustion engine other than the reciprocating engine. For example, the engine may be a rotary engine.

(Intake System)

The air cleaner 1008, the carburetor 1010 and the reactor 1024 are sequentially inserted in the intake pipe 1004 from an inlet 1028 toward the combustion chamber 1022. It is desirable that the reactor 1024 should be inserted into the vicinity of the engine 1002. For example, the reactor 1024 is inserted into an inlet of an intake manifold. Air sucked from the inlet 1028 sequentially passes through the air cleaner 1008, the carburetor 1010 and the reactor 1024 by means of the intake pipe 1004 and is guided to the combustion chamber 1022. The carburetor 1010 may be replaced with another fuel mixing mechanism such as an electronic control type fuel injecting device.

When air passes through the air cleaner 1008, a foreign substance contained in the air is removed. When the air passes through the carburetor 1010, fuel oil such as gasoline is injected in the form of fog into the air so that an air-fuel mixture of the air and the fuel oil is made. When the air passes through the reactor 1024, the air is activated. The activation of the air is a reforming treatment for enhancing the reactivity of the air, for example, the excitation of chemical species into a higher energy level, the generation of an ion, the generation of a radical or the like.

The intake pipe 1004 is a structure in which there is formed a passage through which air flows such as a pipe, a hose or an intake manifold.

The intake air may be a combustion assisting gas other than the air. For example, the intake air may be oxygen.

A combustible liquid other than the fuel oil may be injected in the form of fog into the air. For example, methanol may be injected in the form of fog into the air. A combustible gas may be mixed into the air. For example, a hydrogen gas, a propane gas or the like may be mixed into the air.

Constituents other than the air cleaner 1008, the carburetor 1010 and the reactor 1024 may be inserted into the intake pipe 1004. For example, a throttle valve, an air flow meter or the like may be inserted into the intake pipe 1004. Both or either of the air cleaner 1008 and the carburetor 1010 are/is omitted in some cases. For example, in the case in which the air is sufficiently clear, the air cleaner 1008 is omitted. In the case in which the engine 1002 is a diesel engine or a gasoline direct injecting engine, the carburetor 1010 is omitted and the fuel oil is injected into the combustion chamber 1022.

It is also possible to change the insertion order of the air cleaner 1008, the carburetor 1010 and the reactor 1024.

(Summary of Electrical System)

The circuit diagram of FIG. 2 shows an electrical system which is to be attached to an engine.

As shown in FIGS. 1 and 2, in an electrical system 1030, a DC voltage generated by the battery 1014 is transmitted to a pulse generator body 1018 through a power wiring 1016. A pulse voltage generated by the pulse generator member 1018 is transmitted to the reformer body 1012 through the coaxial cable 1020. When the pulse voltage is transmitted to the reformer body 1012, the pulse voltage is raised by the transformer 1026 so that the pulse voltage thus raised is supplied to the reactor 1024. When the raised pulse voltage is supplied to the reactor 1024, a discharge is generated in the reactor 1024 so that plasma is generated in the reactor 1024 and air passing through the reactor 1024 is activated. It is desirable that the discharge generated in the reactor 1024 should be a dielectric barrier discharge, that is, a streamer discharge.

(Summary of Pulse Generator Body)

The pulse generator body 1018 includes a conduction path 1032, an inductor 1034, a switch circuit 1036 and a capacitor 1038. The reactor 1024 has an anode 1040 and a cathode 1042. The transformer 1026 has a primary winding 1044, a secondary winding 1046 and a magnetic core 1048.

A first DC input terminal 1050 of the pulse generator body 1018 and a positive electrode 1052 of the battery 1014 are electrically connected to each other through the power wiring 1016, and a second DC input terminal 1054 of the pulse generator body 1018 and a negative electrode 1056 of the battery 1014 are electrically connected to each other through the power wiring 1016. Consequently, a DC voltage generated by the battery 1014 is transmitted to the pulse generator body 1018 through the power wiring 1016, and a DC voltage is applied between the first DC input terminal 1050 and the second DC input terminal 1054. The battery 1014 may be replaced with another DC source.

The power wiring 1016 may be omitted to directly connect the first DC input terminal 1050 to the positive electrode 1052 or to directly connect the second DC input terminal 1054 to the negative electrode 1056. The battery 1014 may be provided in the pulse generator body 1018.

(Device to be Inserted in Conduction Path)

The conduction path 1032 extends from a first DC input terminal 1050 to a second DC input terminal 1054 via a first branch 1060 and a second branch 1062 in sequence. The conduction path 1032 is formed by an electric wire, a pattern on a substrate or the like. The inductor 1034 is inserted into a section 1064 from the first branch 1060 to the second branch 1062 in the conduction path 1032. The switch circuit 1036 is inserted into a portion other than the section 1064 of the conduction path 1032. The first DC input terminal 1050 is electrically connected to one of terminals of the inductor 1034, the other terminal of the inductor 1034 is electrically connected to one of terminals of the switch circuit 1036, and the other terminal of the switch circuit 1036 is electrically connected to the second DC input terminal 1054. The switch circuit 1036 may be inserted into a section from the first DC input terminal 1050 to the first branch 1060. Devices other than the inductor 1034 and the switch circuit 1036 may be inserted into the conduction path 1032. For example, a fuse may be inserted into the conduction path 1032.

(Capacitor)

One of terminals of the capacitor 1038 is electrically connected to the first DC input terminal 1050 and the other terminal of the capacitor 1038 is electrically connected to the second DC input terminal 1054.

(Open/Close of Conduction Path Through Switch Circuit)

The switch circuit 1036 electrically opens/closes the conduction path 1032. A current flows through the conduction path 1032 and induction energy is stored in the inductor 1034 while the switch circuit 1036 electrically closes the conduction path 1032. When the switch circuit 1036 electrically opens the conduction path 1032 in a state in which the induction energy is stored in the inductor 1034, a pulse voltage is generated on both terminals of the inductor 1034 by self-induction and a pulse voltage is generated between the first branch 1060 and the second branch 1062.

A portion excluding the reactor 1024 to be a load in the reformer body 1012 and the pulse generator body 1018 functions as a pulse generator having a pulse generating circuit of an induction energy storage type. When the switch circuit 1036 repetitively opens/closes the conduction path 1032, a pulse voltage string is generated on both terminals of the inductor 1034, a pulse voltage string is generated between the first branch 1060 and the second branch 1062, a pulse voltage string is applied to the primary winding 1044, a pulse voltage string is output from the secondary winding 1046 and a pulse voltage string is applied between the anode 1040 and the cathode 1042.

(Internal Circuit of Switch Circuit)

The switch circuit 1036 has a metal-oxide-semiconductor field effect transistor (MOSFET) 1074 and a driving circuit 1076. A drain of the MOSFET 1074 is electrically connected to the other terminal of the inductor 1034 and a source of the MOSFET 1074 is electrically connected to a second DC input terminal 1054. A driving signal is input from the driving circuit 1076 between a gate and the source in the MOSFET 1074. A conduction state is brought between the drain and the source in the MOSFET 1074 and the switch circuit 1036 electrically closes the conduction path 1032 while an ON signal is input between the gate and the source in the MOSFET 1074. A non-conduction state is brought between the drain and the source in the MOSFET 1074 and the switch circuit 1036 electrically opens the conduction path 1032 while an OFF signal is input between the gate and the source in the MOSFET 1074. The MOSFET 1074 may be replaced with a semiconductor switching device of another type. For example, the MOSFET 1074 may be replaced with an insulated gate bipolar transistor (IGBT), a static induction thyristor (an SI thyristor), a bipolar transistor or the like. In the case in which the semiconductor switching device is changed, the driving circuit is varied depending on the semiconductor switching device and a necessary bias circuit is added. The switch circuit 1036 may have two semiconductor switching devices or more. The two semiconductor switching devices or more may be devices of the same type or different types.

(Separation of Pulse Generating Function and Boosting Function through Coaxial Cable)

The first branch 1060 is electrically connected to a first input terminal 1066 of the primary winding 1044 through an external conductor 1068 of the coaxial cable 1020. The second branch 1062 is electrically connected to a second input terminal 1070 of the primary winding 1044 through an internal conductor 1072 of the coaxial cable 1020. When a pulse voltage is generated between the first branch 1060 and the second branch 1062, the pulse voltage is transmitted from the pulse generator body 1018 to the primary winding 1044 through the coaxial cable 1020 and is input to the primary winding 1044. When the pulse voltage is applied to the primary winding 1044, a raised pulse voltage is output from the secondary winding 1046.

The coaxial cable 1020 may be replaced with a transmission line of another type. For example, the coaxial cable 1020 may be replaced with a twisted pair cable, a parallel feeder, a shielding wire or the like. In more general, the first branch 1060 and the first input terminal 1066 are electrically connected to each other through a first transmission wire of the transmission line. Moreover, the second branch 1062 and the second input terminal 1070 are electrically connected to each other through a second transmission wire of the transmission line. The first transmission wire and the second transmission wire are caused to approach each other and a relative interval between the first transmission wire and the second transmission wire is fixed. Consequently, leakage of a signal to be transmitted in a normal mode is reduced.

(Internal Connection of Reformer Body)

A first output terminal 1078 of the secondary winding 1046 is electrically connected to the anode 1040, and a second output terminal 1080 of the secondary winding 1046 is electrically connected to the cathode 1042. When a pulse voltage is output from the secondary winding 1046, consequently, a pulse voltage is applied between the anode 1040 and the cathode 1042.

(Independence of Transformer from Inductor)

The transformer 1026 is magnetically independent from the inductor 1034. The magnetic independence of the transformer 1026 from the inductor 1034 implies that a mutual inductance between a winding of the transformer 1026 and the inductor 1034 is so small as to be disregarded with respect to the self-inductance of the winding of the transformer 1026 and the self-inductance of the inductor 1034, for example, $1/100$ or less. Accordingly, the pulse voltage is exclusively transmitted via the coaxial cable 1020 between the transformer 1026 and the inductor 1034.

(Relationship Between Excitation Inductance of Inductor and Excitation Inductance of Primary Winding)

The excitation inductance L2 of the primary winding 1044 is higher than the excitation inductance L1 of the inductor 1034 (L1<L2), and is desirably five times as high as the excitation inductance L1 or more (5×L1<L2). When induction energy is stored in the inductor 1034, consequently, a large current does not flow to the coaxial cable 1020, and the storage of the induction energy in the inductor 1034 cannot be disturbed even if the length of the coaxial cable 1020 is increased so that a pulse voltage having a high peak voltage is generated. Even if the length of the coaxial cable 1020 is increased, moreover, the influence of a parasitic capacitance is small and a pulse voltage having a small pulse width is generated. Furthermore, the induction energy to be stored in the inductor 1034 is higher than the induction energy to be stored in the transformer 1026 so that the pulse voltage is efficiently transferred from the inductor 1034 to the transformer 1026.

(Positional Relationship among Transformer, Switch Circuit and Combustion Chamber)

Figure 3:
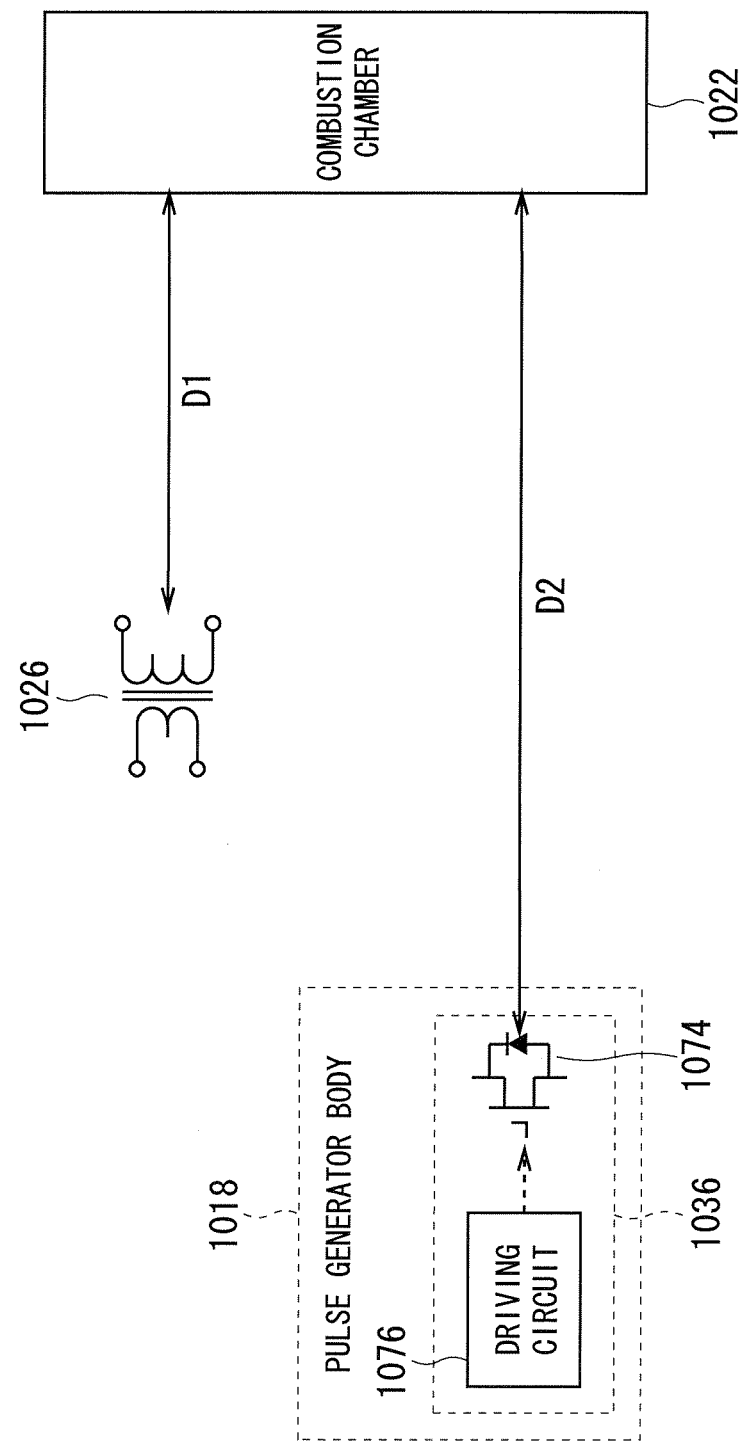
FIG. 3 is a schematic diagram showing a positional relationship among a transformer, a switch circuit and a combustion chamber.

The schematic diagram of FIG. 3 shows a positional relationship among the transformer, the semiconductor switching device and the combustion chamber.

As shown in FIG. 3, the transformer 1026 is disposed relatively close to the combustion chamber 1022 and the pulse generator body 1018 is disposed relatively apart from the combustion chamber 1022. Consequently, the transformer 1026 is disposed relatively close to the combustion chamber 1022, and the switch circuit 1036 and the MOSFET 1074 are disposed relatively apart from the combustion chamber 1022. The distance D2 from the combustion chamber 1022 to the MOSFET 1074 is greater than the distance D1 from the combustion chamber 1022 to the transformer 1026.

In the electrical system 1030, accordingly, the MOSFET 1074 is disposed in an environment having a lower temperature than in the transformer 1026 so that the heat radiation of the MOSFET 1074 can easily be carried out. This is enabled by separation of a pulse generating function and a boosting function through the coaxial cable. The temperature of the environment in which the transformer 1026 is to be disposed is typically equal to or higher than 85 and is equal to or lower than 150° C. The temperature of the environment in which the MOSFET 1074 is to be disposed is desirably maintained to be equal to or higher than −45° C. and to be less than 85° C., which is lower than the temperature of the environment in which the transformer 1026 is to be disposed.

The schematic diagram of FIG. 4 shows a desirable cooling configuration for a switch circuit to be preferably employed in the pulse generator.

It is desirable that the MOSFET 1074 should be cooled by the cooing mechanism 1078 as shown in FIG. 4. Consequently, the temperature of the MOSFET 1074 is lowered so that the electrical system 1030 is operated stably. The MOSFET 1074 may be cooled by air cooling or water cooling. In the case in which the engine 1002 is incorporated into a car and the MOSFET 1074 is cooled by the water cooling, the cooling water for the engine 1002 may be utilized as the cooling water for the MOSFET 1074 or the cooling water for the MOSFET 1074 may be prepared separately from the cooling water for the engine 1002.

(Summary of Structure of Reactor)

Figure 5:
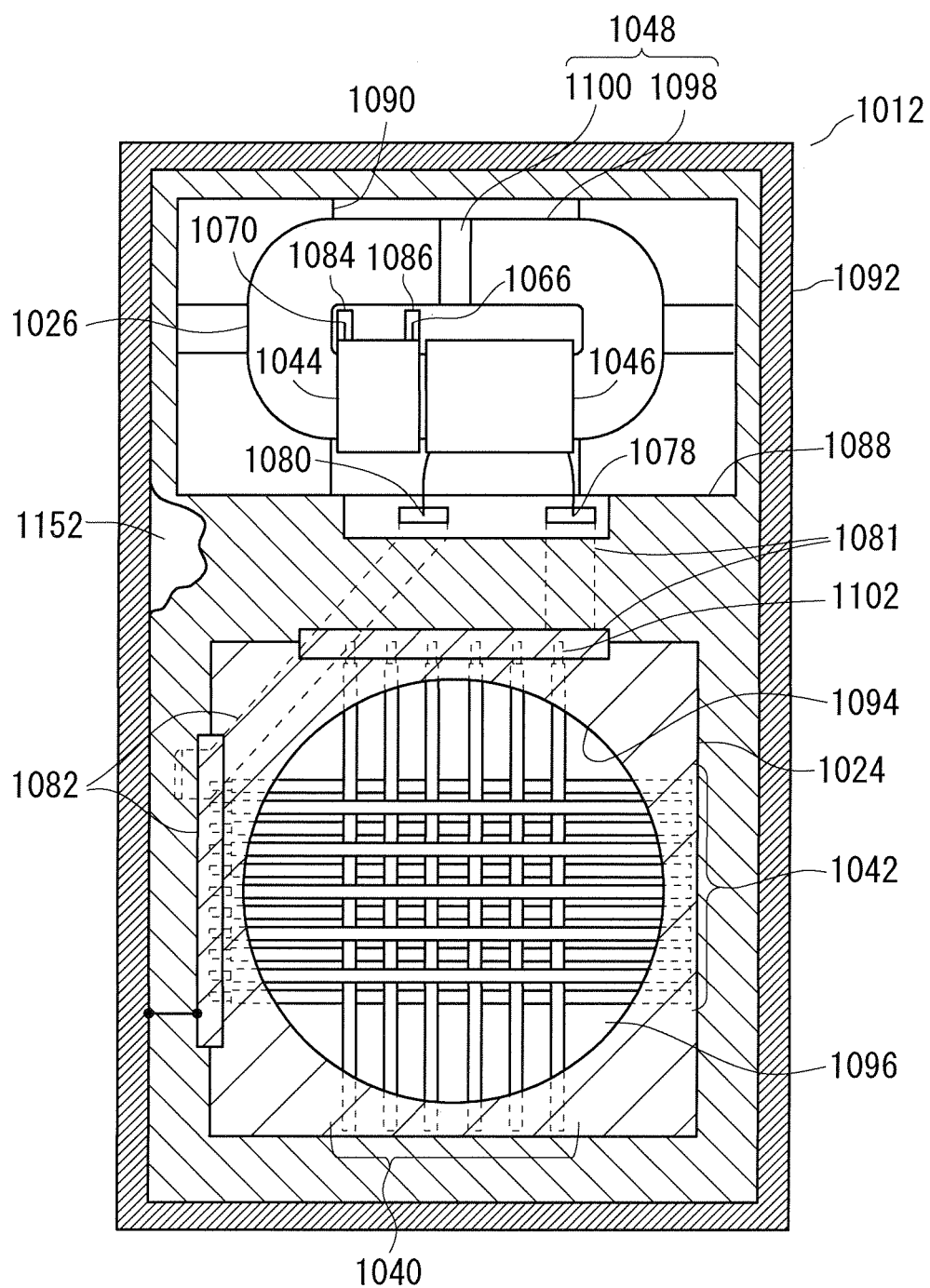
FIG. 5 is a cross-sectional view showing a reactor.
Figure 6:
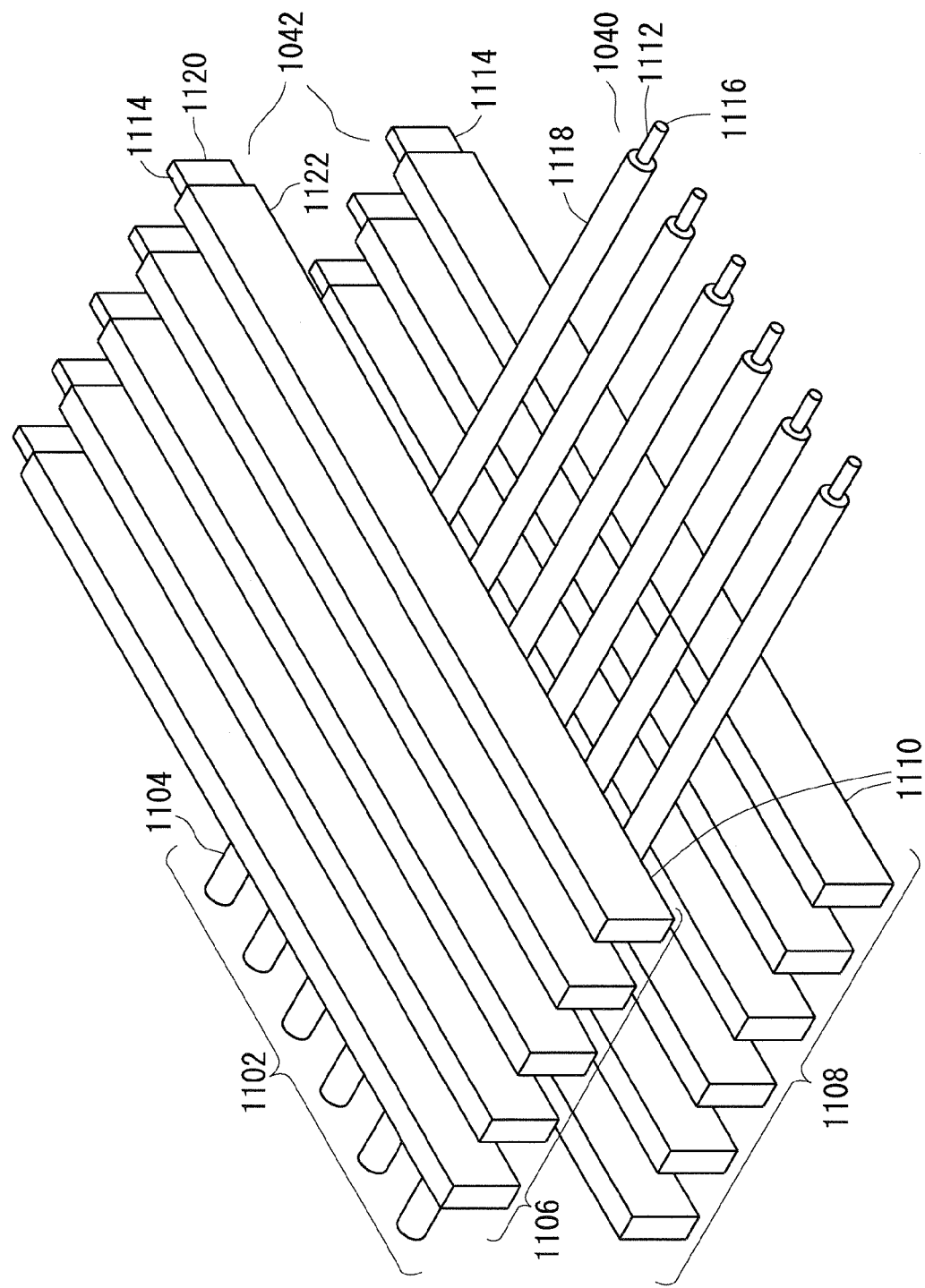
FIG. 6 is a perspective view showing an anode and a cathode.

The schematic diagram of FIG. 5 shows a cross-section of the reformer body. The schematic diagram of FIG. 6 is a perspective view showing the anode and the cathode.

As shown in FIG. 5, the reformer body 1012 has a feeding path 1081 on the anode side, a feeding path 1082 on the cathode side, a positive electrode connecting terminal 1084, a negative electrode connecting terminal 1086, a transformer chamber formation 1088, a transformer holding member 1090 and a housing 1092 in addition to the reactor 1024 and the transformer 1026. The reactor 1024 has a passage formation 1094 in addition to the anode 1040 and the cathode 1042. A passage 1096 is provided in the passage formation 1094. An inlet and an outlet of the passage 1096 are connected to the intake pipe 1004. The air passing through the reactor 1024 flows through the passage 1096. Constituents of the reactor 1024 are accommodated in a housing space 1152 formed in a housing 1094. The raised pulse voltage may be supplied to the ignition plug 1124 in place of the reactor 1024, and the pulse generator may be used for ignition of an air-fuel mixture in place of the activation of the air.

(Magnetic Core)

The primary winding 1044 and the secondary winding 1046 are magnetically coupled to each other by means of the magnetic core 1048. The magnetic core 1048 constitutes a magnetic circuit passing through the primary winding 1044 and the secondary winding 1046. The magnetic core 1048 takes a shape of a ring. For example, the magnetic core 1048 takes a shape of a toroidal core, a UI core or the like. The magnetic core 1048 may take a composite shape having a plurality of ring shapes. For example, the magnetic core 1048 may take a shape of a spectacle core, an EI core or the like. It is desirable that the magnetic core 1048 should have an incomplete ring member 1098 formed by a ferromagnetic material and a gap filling member 1100 formed by a paramagnetic material. For example, the incomplete ring member 1098 is constituted by ferrite or the like. The gap filling member 1100 is constituted by an epoxy resin, a silicone resin or the like. The incomplete ring member 1098 has a short gap. The gap filling member 1100 fills in the gap. The primary winding 1044 and the secondary winding 1046 are wound upon the incomplete ring member 1098. Consequently, the hysteresis of magnetization of the magnetic core 1048 is decreased and the state of magnetization of the magnetic core 1048 is returned into a certain state after the pulse is generated so that a uniform pulse is generated. It is desirable that the gap filling member 1100 should be formed by an insulator. The whole magnetic core 1048 can also be permitted to be formed by the ferromagnetic material.

(Summary of Structure of Electrode)

As shown in FIG. 6, the anode 1040 has an anode bar array 1102. In the anode bar array 1102, an anode bar 1104 is arranged. The cathode 1042 has a first cathode plate array 1106 and a second cathode plate array 1108. In the first cathode plate array 1106 and the second cathode plate array 1108, cathode plates 1110 are arranged.

The electrode structure shown in FIG. 6 may be replaced with another electrode structure. For example, the electrode structure shown in FIG. 6 may be replaced with a parallel plate type, a coaxial cylinder type or the like.

(Connection of Transformer, Electrode and Terminal)

The first output terminal 1078 and a feeding terminal 1112 of the anode bar 1104 are electrically connected to each other through the feeding passage 1081 on the anode side. The feeding passage 1081 on the anode side may be omitted to directly connect the first output terminal 1078 to the feeding terminal 1112 of the anode bar 1104. The second output terminal 1080 and a feeding terminal 1114 of the cathode plate 1110 are electrically connected to each other through the feeding path 1082 on the cathode side. The feeding passage 1082 on the cathode side may be omitted to directly connect the second output terminal 1080 to the feeding terminal 1114 of the cathode plate 1110. When a raised pulse voltage is applied between the anode 1040 and the cathode 1042, a discharge is generated between the anode 1040 and the cathode 1042 in the passage 1096 so that plasma is generated in the passage 1096 and air flowing through the passage 1096 is thus activated. In the case in which the raised pulse voltage is supplied to the ignition plug 1124 in place of the reactor 1024, the first output terminal 1078 and a center electrode 1126 of the ignition plug 1124 are electrically connected to each other and the second output terminal 1080 and a ground electrode 1128 of the ignition plug 1124 are electrically connected to each other.

(Structure of Anode Bar Array)

In the anode bar array 1102, two anode bars 1104 or more are arranged. Consequently, the region generated by the plasma is expanded so that the air is reformed efficiently. The number of the arrays of the anode bars 1104 is increased/decreased if necessary. The anode bar array 1102 may be replaced with a single anode bar 1104.

The two anode bars 1104 or more are arranged sparsely. The "sparse" arrangement of the anode bars 1104 implies that the two anode bars 1104 or more do not come in contact with each other and a gap is present between the first anode bar 1104 and the second anode bar 1104 which is adjacent to the first anode bar 1104. Consequently, the air passes through the gap and flows in the vicinity of the region generated by the plasma so that the air is activated efficiently.

The two anode bars 1104 or more are desirably arranged in parallel at an equal interval. Consequently, the gap is distributed uniformly over the cross-section of the passage 1096 and the air flows evenly through the passage 1096 so that a discharge is generated uniformly. These contribute to the efficient activation of the air.

(Arrangement of Anode Bar)

The anode bar 1104 crosses the passage 1096. The "crossing" of the passage 1096 implies that the anode bar 1104 goes out of a first position on an internal surface of the passage 1096 and passes through the passage 1096, and enters a second position on the internal surface of the passage 1096. Consequently, both ends of the anode bar 1104 which are apt to be damaged are positioned on an outside of the passage 1096 and are not opposed to the cathode 1042, and do not serve as a start point or an end point of a discharge. This contributes to the suppression in the damage of the anode bar 1104. Moreover, the feeding terminal 1112 of the anode bar 1104 is positioned on the outside of the passage 1096 so that the supply of power to the anode bar 1104 can easily be carried out.

(Structure of Anode Bar)

The anode bar 1104 has a conductor bar 1116 and an insulator film 1118. A surface of the conductor bar 1116 is covered with the insulator film 1118 in a portion other than the vicinity of one of the ends of the anode bar 1104. The surface of the conductor bar 1116 is not covered with the insulator film 1118 but is exposed in the vicinity of one of the ends of the anode bar 1104. A portion of the anode bar 1104 where the surface of the conductor bar 1116 is exposed serves as the feeding terminal 1112 of the anode bar 1104. Consequently, the surface of the conductor bar 1116 is not exposed at all or is rarely exposed in the passage 1096 so that an arc discharge is suppressed and the air is thus activated efficiently.

(Structure of Cathode Plate Array)

Two cathode plates 1110 or more are arranged in each of the first cathode plate array 1106 and the second cathode plate array 1108. Consequently, the region generated by the plasma is expanded so that the air is reformed efficiently. The number of arrays of the cathode plates 1110 is increased/decreased if necessary. Both or either of the first cathode plate array 1106 and the second cathode plate array 1108 may be replaced with the single cathode plate 1110.

The two cathode plates 1110 or more are arranged sparsely. The "sparse" arrangement of the cathode plates 1110 implies that the two cathode plates 1110 or more do not come in contact with each other and a gap is present between the first cathode plate 1110 and the second cathode plate 1110 which is adjacent to the first cathode plate 1110. Consequently, the air passes through the gap and flows in the vicinity of the region generated by the plasma so that the air is reformed efficiently.

The two cathode plates 1110 or more are desirably arranged in parallel at an equal interval. Consequently, the gap is distributed uniformly over the cross-section of the passage 1096 and the air flows evenly through the passage 1096 so that a discharge is generated uniformly. These contribute to the efficient reformation of the air.

A main surface of the cathode plate 1110 is parallel with an extending direction of the passage 1096. Consequently, the flow of the air can be prevented from being disturbed by the cathode plate 1110 so that the air uniformly flows through the passage 1096 and the discharge is thus generated evenly.

(Arrangement of Cathode Plate)

The cathode plate 1110 crosses the passage 1096. Consequently, both ends of the cathode plate 1110 which are apt to be damaged are positioned on the outside of the passage 1096 and are not opposed to the anode 1040, and do not serve as a start point or an end point of a discharge. This contributes to the suppression in the damage of the cathode plate 1110. Moreover, the feeding terminal 1114 of the cathode plate 1110 is positioned on the outside of the passage 1096 so that the supply of power to the cathode plate 1110 can easily be carried out.

(Structure of Cathode Plate)

The cathode plate 1110 has a conductor plate 1120 and an insulator film 1122. A surface of the conductor plate 1120 is covered with the insulator film 1122 in a portion other than the vicinity of one of the ends of the cathode plate 1110. The surface of the conductor plate 1120 is not covered with the insulator film 1122 but is exposed in the vicinity of one of the ends of the cathode plate 1110. A portion of the cathode plate 1110 where the surface of the conductor plate 1120 is exposed serves as the feeding terminal 1114 of the cathode plate 1110. Consequently, the surface of the conductor plate 1120 is not exposed at all or is rarely exposed in the passage 1096 so that an arc discharge is suppressed and the air is thus reformed efficiently.

The cathode plate 1110 is a thin and long member taking a shape of a slender plane in which a long side is remarkably longer than a short side. The long side of the cathode plate 1110 has an extending direction which is equivalent to that of the cathode plate 1110. The short side of the conductor plate 1120 may be extended or reduced or may be almost equal to the thickness of the conductor plate 1120. In other words, the cathode plate 1110 may take a shape which does not belong to the category of a plate.

(Position of Anode Bar Array, First Cathode Plate Array and Second Cathode Plate Array)

The first cathode plate array 1106 and the second cathode plate array 1108 are separated from the anode bar array 1102 in the extending direction of the passage 1096.

The air flowing in the passage 1096 sequentially passes through the gap of the first cathode plate array 1106, the gap of the anode bar array 1102 and the gap of the second cathode plate array 1108. Consequently, the air flowing in the passage 1096 is activated by a plasma generated in a section from the first cathode plate array 1106 to the anode bar array 1102, and is further activated by a plasma generated in a section from the anode bar array 1102 to the second cathode plate array 1108.

(Increase/Decrease in Anode Bar Array and Cathode Plate Array)

Either of the first cathode plate array 1106 and the second cathode plate array 1108 may be omitted. It is also possible to add a cathode plate array other than the first cathode plate array 1106 and the second cathode plate array 1108. It is also possible to add an anode bar array other than the anode bar array 1102.

(Relationship between Extending Direction of Anode Bar and Extending Direction of Cathode Plate)

The extending direction of the anode bar 1104 and that of the cathode plate 1110 are not parallel with each other and are desirably orthogonal to each other. Consequently, the anode bar 1104 and the cathode plate 1110 intersect with each other as seen in an axial direction of the passage 1096, and a discharge tends to be generated on an intersection point of the anode bar 1104 and the cathode plate 1110 as seen in the axial direction of the passage 1096 so that the air is activated efficiently.

It is desirable that the anode bar 1104 and the cathode plate 1110 should be extended linearly.

(Structure of Passage Formation)

The passage formation 1094 is a structure in which the passage 1096 is formed. The passage 1096 takes a cross-sectional shape of a circle. The passage 1096 may take a cross-sectional shape other than the circle. It is desirable that the passage 1096 should be extended linearly.

(Material of Structure)

The conductor bar 1116, the conductor plate 1120, the feeding path 1081 on the anode side and the feeding path 1082 on the cathode side are formed by stainless steel. These constituents are also permitted to be formed by a conductor other than the stainless steel. For example, these constituents are also permitted to be formed by a metal such as copper, aluminum or nickel or an alloy containing these metals as a principal component.

The passage formation 1094 is constituted by a polyetheretherketone (PEEK) resin. These constituents are also permitted to be formed by an insulator other than the polyetheretherketone resin. For example, these structures are also permitted to be formed by an epoxy resin.

The insulator film 1118 and the insulator film 1122 are constituted by alumina ceramics. The insulator film 1118 and the insulator film 1122 are also permitted to be constituted by an insulator other than the alumina ceramics. For example, the insulator film 1118 and the insulator film 1122 are also permitted to be constituted by zirconia ceramics, a fluorocarbon resin or the like.

(Use for Engine)

The engine 1002 is typically incorporated into a car and serves as a power source. The engine 1002 may be incorporated into a transportation machine other than the car. For example, the engine 1002 may be incorporated into a railway vehicle, an industrial vehicle, a water vehicle, an airplane, a spacecraft and the like. The engine 1002 may be incorporated into a machine other than the transportation machine. For instance, the engine 1002 may be incorporated into a tool, a farm tool, a generator and the like. The pulse generator may be an accessory of a different device from the engine 1002.

While the invention has been shown and described in detail, the foregoing description is in all aspects illustrative and not restrictive. It is therefore understood that numerous modifications and variations can be devised without departing from the scope of the invention.

EXPLANATION OF DESIGNATION 1002 engine
1004 intake pipe
1018 pulse generator body
1020 coaxial cable
1022 combustion chamber
1024 reactor
1034 inductor
1036 switch circuit
1026 transformer
1032 conduction path
1060 first branch
1062 second branch
1074 MOSFET

The invention claimed is:
1. A pulse generator comprising:
a conduction path extending from a first DC input terminal to a second DC input terminal via a first branch and a second branch in sequence;
an inductor inserted in a section from said first branch to said second branch in said conduction path and having a first excitation inductance;
a switch circuit inserted in a portion other than said section of said conduction path, including a semiconductor switching device disposed in an environment having a relatively low temperature and electrically opening/closing said conduction path;

a transformer including a primary winding having a first input terminal and a second input terminal and having a second excitation inductance that is higher than said first excitation inductance and a secondary winding having a first output terminal and a second output terminal, disposed in an environment having a relatively high temperature and is magnetically independent from said inductor;

a transmission line including a first transmission wire electrically connecting said first branch and said first input terminal to each other and a second transmission wire electrically connecting said second branch and said second input terminal to each other; and a cooling mechanism for cooling said semiconductor switching device.

2. The pulse generator according to claim 1, wherein said transformer further includes a magnetic core having an incomplete ring member upon which said primary winding and said secondary winding are wound and which has a gap and is formed by a ferromagnetic material, and a gap filling member which fills in said gap and is formed by a paramagnetic material.

3. A method of disposing a pulse generator comprising the steps of:

(a) preparing a pulse generator including a conduction path, an inductor, a switch circuit, a transformer and a transmission line, said conducting path extending from a first DC input terminal to a second DC input terminal via a first branch and a second branch in sequence, said inductor being inserted in a section from said first branch to said second branch in said conduction path and having a first excitation inductance, said switch circuit being inserted in a portion other than said section of said conduction path, including a semiconductor switching device and electrically opening/closing said conduction path, said transformer including a primary winding which has a first input terminal and a second input terminal and has a second excitation inductance that is higher than said first excitation inductance and a secondary winding which has a first output terminal and a second output terminal and being magnetically independent from said inductor; and said transmission line including a first transmission wire for electrically connecting said first branch and said first input terminal to each other and a second transmission wire for electrically connecting said second branch and said second input terminal to each other; and (b) disposing said pulse generator in such a manner that said semiconductor switching device is provided in an environment having a relatively low temperature and said transformer is provided in an environment having a relatively high temperature.

* * * * *